United States Patent [19]

Meyer

[11] Patent Number: 4,810,951
[45] Date of Patent: Mar. 7, 1989

[54] CAPACITATIVE DEVICE FOR MEASURING LENGTHS AND ANGLES

[76] Inventor: Hans U. Meyer, Rue de Lausanne, 42, 1110 Morges, Switzerland

[21] Appl. No.: 933,468

[22] Filed: Nov. 21, 1986

[30] Foreign Application Priority Data

Nov. 22, 1985 [CH] Switzerland .................. 05004/85

[51] Int. Cl.⁴ .......................................... G01R 27/26
[52] U.S. Cl. .......................... 324/61 R; 340/870.37
[58] Field of Search ............... 324/61 R, 60 R, 60 C, 324/61 QS; 340/870, 37

[56] References Cited

U.S. PATENT DOCUMENTS

| | | | |
|---|---|---|---|
| 2,674,729 | 4/1954 | Carter | 340/870.37 |
| 3,146,394 | 8/1964 | Frisch | 340/870.37 |
| 3,219,920 | 11/1965 | Wall | 340/870.37 |
| 4,350,981 | 9/1982 | Tanaka et al. | 340/870.37 |
| 4,429,307 | 1/1984 | Fortescue | 340/870.37 |
| 4,437,055 | 3/1984 | Meyer | 324/61 R |
| 4,449,179 | 5/1984 | Meyer | 324/61 R |
| 4,504,832 | 3/1985 | Conte | 340/870.37 |
| 4,522,517 | 6/1985 | Wade et al. | 340/870.37 |

Primary Examiner—A. D. Pellinen
Assistant Examiner—A. Jonathan Wysocki
Attorney, Agent, or Firm—Gifford, Groh, VanOphem, Sheridan, Sprinkle and Dolgorukov

[57] ABSTRACT

The device consists of a slider (2) operating in a sliding manner with respect to a ruler (1). Slider (2) is fitted with emitting electrodes (10) and receiving electrodes (19,20) connected to an electronic assembly (50). Ruler (1) is provided with L and inverted L-shaped coupling electrodes (6,7) which interlock mutually to form electrode-pairs which position is limited by straight lines. The vertical parts of the L's (40) are arranged to face emitting electrodes (10), whereas the horizontal parts of the L's (41) are arranged to face the receiving electrodes (19,20), providing an optimal capacitative coupling. This arrangement of the coupling electrodes (6,7) makes it possible to obtain a precision type manufacture of the ruler and a side by side (juxtaposition) arrangement of several rulers to fit the measuring needs.

7 Claims, 3 Drawing Sheets

CAPACITATIVE DEVICE FOR MEASURING LENGTHS AND ANGLES

BACKGROUND OF THE INVENTION

I. Field of the Invention

The present invention deals of capacitative device for measuring lengths and angles, consisting with a first and second parts arranged in a sliding manner in the direction of displacement and measuring of one part against the other, the first part carrying elongated emitting electrodes, disposed perpendicularly to the said direction, to form a series of at least two receiving electrodes, arranged laterally on each side of this series, the second part being provided with coupling electrodes, facing the emitting and receiving electrodes. An electronic arrangement being implemented in a manner to measure relative displacement of the two parts by means of capacitative coupling through the coupling electrodes between the emitting and receiving electrodes.

II. Description of the Prior Art

Such a device is already known by the German Pat. No. 3340/82, which describes a ruler having two rows of T-shaped coupling electrodes, penetrating each other and completing an efficient coupling, because the coupling surface between the electrodes is large. The coupling electrodes are generally fabricated by means of a laser beam cutting process, for example, which is adequate. The cutting process in this known device is complicated. With this method, it is difficult to obtain a high precision cutout, causing measuring errors. Also, it advantageous to provide for lengthening and shortening of the ruler according to the need of measuring of smaller rulers, by putting them side by side. This juxtaposition method is, however, impossible with the known device.

SUMMARY OF THE PRESENT INVENTION

The purpose of this invention is to alleviate these inconveniences. For that purpose the device is provided with L-shaped and inverted L-shaped coupling electrodes which inrterlock with each other. The vertical part of the L's and the inverted L's are arranged to face the emitting electrodes and the horizontal parts of the L's and inverted L's are arranged to face one or the other of the receiving electrodes. This arrangement permits a fast and accurate cutout of the coupling electrodes and a side by side placement of the partial rulers, adapting themselves to the different measuring needs, while still maintaining the largest possible coupling surface with the receiving electrodes.

Other advantages of the invention emanate from the invention, in particular, the mutual arrangement of the emitting, receiving and coupling electrodes and the associated electronic assembly, making it possible to identify the measurement when the captured signal on the receiving electrodes is equal to zero.

The attached drawing represents, for sake of example, the form of execution being the object of the present invention.

DETAILED DESCRIPTION OF A PREFERRED EMBODIMENT OF THE PRESENT INVENTION

Figure 1:
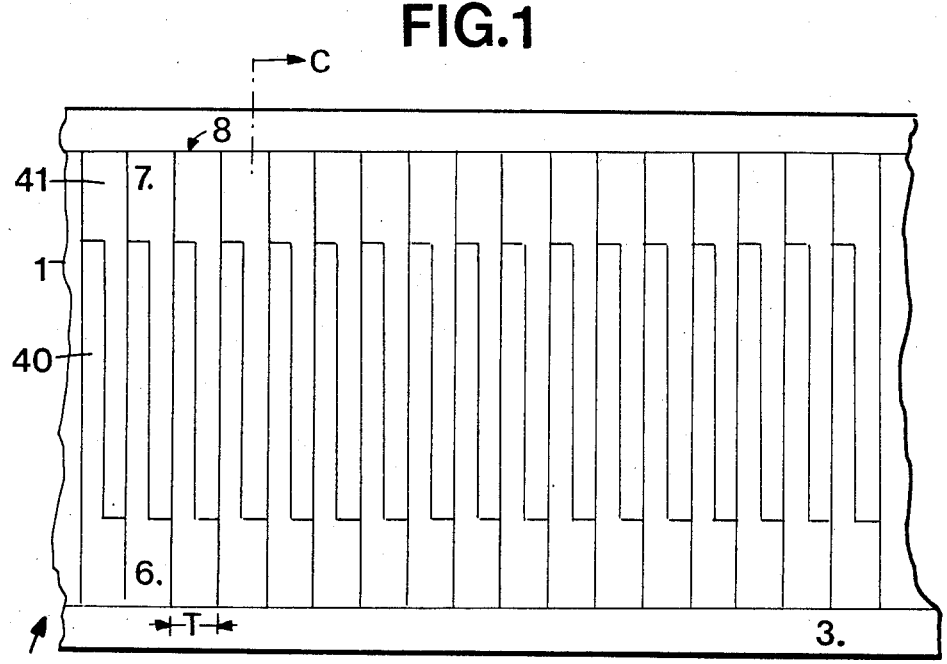
FIG. 1 represents the stationary part of the device in plain view.
Figure 2:
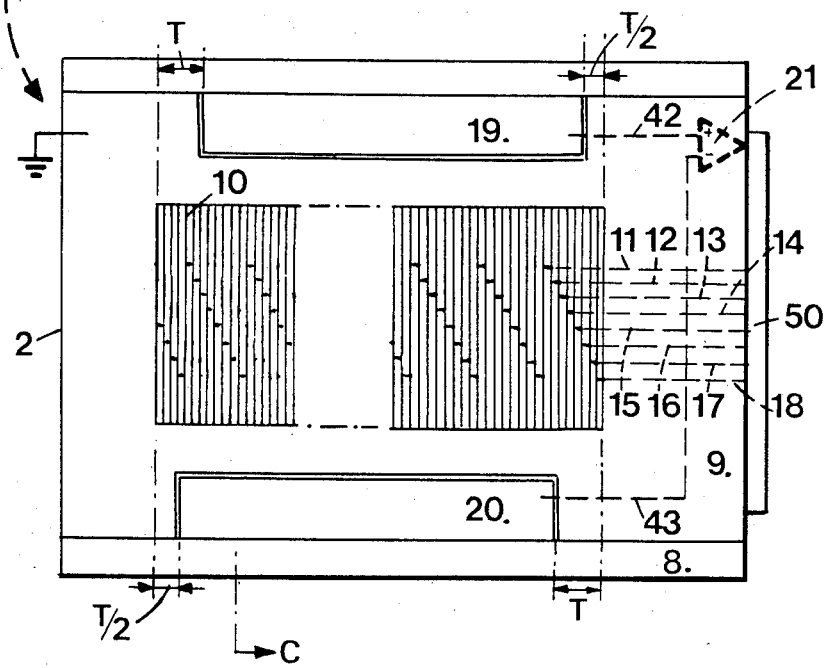
FIG. 2 shows the slider from the bottom view.
Figure 3:
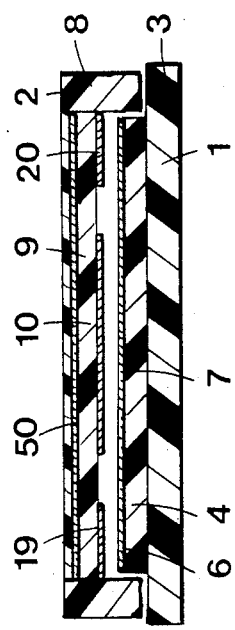
FIG. 3 is a schematic cross section across the CC-line of FIGS. 1 and 2.

As shown on FIGS. 1 and 3, the device has a stationary part 1 in the shape of a ruler and a slider 2, sliding on that ruler. The stationary part 1 has a bottom piece, preferably made of steel, and a carrier 4, made of insulated material, on which the metallic coupling electrodes 6 and 7 are attached. These electrodes are insulated from each other and have no electrical connections. These electrodes have the shape of an L and an inverted L so that an L-shaped electrode 6 interlocks with an inverted L-shaped electrode 7. A pair of electrodes 6 and 7 form an assembly 8, limited by two lines arranged vertically to the ruler and repeat themselves with an axis interval, designated by the letter T on the drawing. This 6 and 7 coupling electrode arrangement makes it possible to cut the ruler according to a straight line or to add partial rulers end to end to form a ruler of multiple lengths. Furthermore, this very simple geometrical arrangement makes it possible to fabricate a ruler through easy and fast cutout of electrodes from a metallic layer deposited by evaporation on the plate 4, made of insulated material.

A Slider 2 consists of a body 8 sliding on the base 3 and a plate 9 made of insulated material, carrying on one of its faces the emitter electrodes 10 and the receiving electrodes 19, 20 and, on the other face, part of the electronic mounting 50 associated with it.

The emitting electrodes 10 are arranged to face the vertical part 40 of the L-shaped coupling electrodes 6 and 7 and have a spacing between them of $L = T/2N$, 2N being equal to 8 in the represented design, as shown. The total number of emitting electrodes on the slider is equal to $(2K+1) \times N$, where K is an integer, equal to 9 in the shown example. The number of emitting electrodes is, therefore, equal to 76. They are connected to the electronic assembly 50 with wires 11 to 18 with a repetition rate of 2N, i.e., in the represented design, each eighth emitting electrode 10 is connected to the same outlet of the electronic assembly.

Receiving electrodes 19, 20 are made of rectangular plates arranged perpendicularly to the emitting electrodes 10 and electrically isolated from the latter. These receiving electrodes are facing the horizontal parts 41 of the L's of the coupling electrodes 6,7 and their length is a multiple integer of the distance T, in the shown example equal to 8T. Furthermore, receiving electrode 20 facing coupling electrodes 7 is offset by a distance of T/2 in the direction of the slider length with respect to the receiving electrode 19. To avoid the edge effects, the length of the receiving electrodes 19,20 is shorter than the total width $(K+\frac{1}{2}) \times T$ of the emitting electrodes 10. In the representative example, it is equal to $(K-1) \times T$. The edge of the receiving electrodes 19,20 is, therefore, offset, on one side, by a distance T/2 and by a distance T, on the other side, with respect to the external limit of the emitting electrodes 10.

Figure 4:
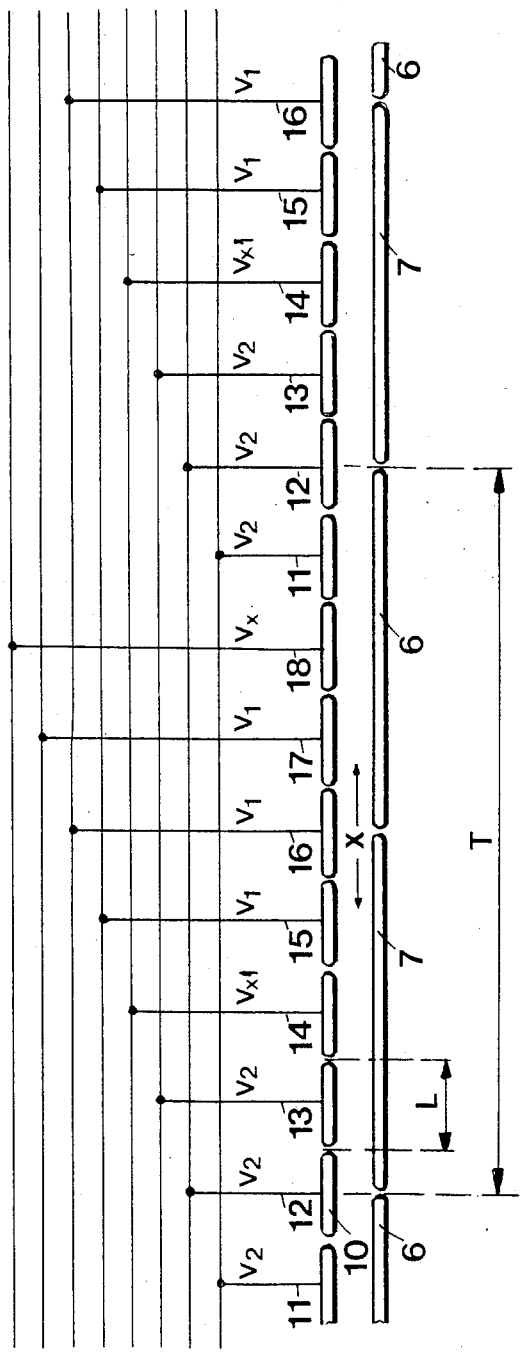
FIG. 4 shows schematically the measuring principle.
Figure 5:
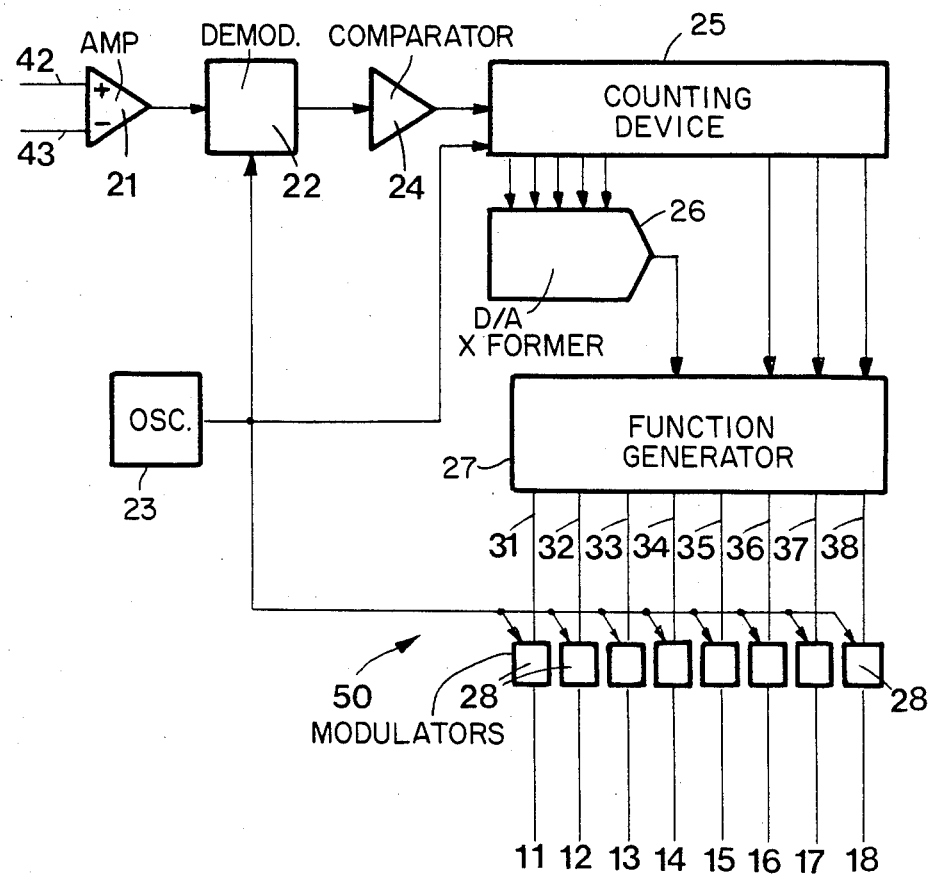

The receiving electrodes 19,20 are connected to the electrical assembly 50, shown in FIG. 5, with wires 42, 43 and whose measurement principle is illustrated on FIG. 4. Referring to that FIG. 4, electrodes 10, facing coupling electrodes 6,7, are connected to four alternating current voltages $V_i$, $V_2$, $V_x$ and $V_{x1}$. Emitting electrodes 10 which face the central portion of the coupling electrodes 6 and 7, are connected to a variable voltage $V_x$, $V_{x1}$, while the neighboring electrodes on one side are connected to a constant amplitude alternating voltage $V_1$ and with an alternating voltage $V_2$, on the other side. Both voltages $V_1$ and $V_2$ have the same frequency and amplitude, but they are of the opposite phase. Also, the variable voltages $V_x$ and $V_{x1}$ have the same frequency as $V_1$ and $V_2$; their amplitude is identical and varies between amplitude $V_1$ and $V_2$ when passing through zero, however they are of opposite phase.

If we assume as a measuring condition that the sum of the alternating currents at the coupling electrodes 6 and 7, which means that these voltages at the receiving electrodes 19,20, must be equal to zero, we realize that for a relative coupling electrodes 6 and 7, displacement X with respect to the receiving electrodes 10, the amplitudes of voltages $V_x$ and $V_{x1}$ vary linearly with the displacement X and, for a displacement on a distance equal to the average interval (L) of the emitting electrodes 10, this amplitude passes through zero for the reason that a change of phase has occurred from $V_1$ to $V_2$.

The marginal conditions to the limits of an interval (L) correspond to an interpolation interval are found to be exactly defined: these conditions are materialized if the alternating voltages applied on the coupling electrodes 6, respectively 7 turn to zero for $V_x=V_1$, respectively for $V_x=V_2$. If this is the case, the division of the emitting electrodes is displaced by one electrode through electronic means.

Thus, the ditribution of voltages applied to the emitting electrodes is a periodical function of slider 2 position having a period of 2N.

FIG. 5 is a schematical representation of an electronic assembly used for that purpose. The signal received on wires 42,43 and coming from receiving electrodes 19,20, through capacitative coupling by means of coupling electrodes 6,7 is amplified by a differential amplifier 21 and put, at low impedance, into a synchronous demodulator 22, controlled by an oscillator 23. Next, the signal is analyzed by a comparator 24 which controls the up and down counting of a binary counter 25. The counting input of counter 25 is also connected for sake of simplified representation, to oscillator 23.

If the demodulated signal produced at the output of the demodulator is equal to zero, the output of comparator 24 is also equal to zero and the reading on counter 25 remains unchanged. On the contrary, if the demodulated signal is other than zero, the output of the comparator is activated and supplies a counting signal to counter 25. The latter changes its count synchronously with oscillator 23 until the signal of the demodulator 22 is also equal to zero.

The low value outputs of counter 25 control a digital-analog transformer 26 which supplies the modulation voltage for varying the amplitude which produces itself linearly as a displacement function of the emitting electrodes connected to the variable voltages $V_x$ and $V_{x1}$. This modulation voltage as well as the high output values of the counter enter into a function generator 27 which has 2N outputs. (in the present case, 8 outputs) 31 to 38.

Each of the outputs 31 to 38 are put into a modulator 28 connected to oscillator 23. These modulators 28 produce a modulated wave from the pulses supplied by oscillator 23 and by the modulation voltages supplied at each output 31 through 38 of generator 27, in the form of an alternating voltage $V_1$, $V_2$ or $V_x$ or $V_{x1}$. These alternating voltages are conducted towards the emitting electrodes 10.

The condition of counter 25 is, therefore, a direct measurement of the position of the emitting electrodes 10 with respect to coupling electrodes 19 and 20. The sum of the alternating currents at the coupling electrodes being equal to zero. The high values of counter 25 constitute a gross measurement of the displacement by counting of the integer values of distances L travelled by the slider and the low values of counter 25 represent the fine measurements by linear interpolation. A detailed description of the interpolation procedure is given by the European Pat. No. 0053091.

Instead of varying the amplitude of the changing alternating voltages $V_x$ and $V_{x1}$, linearly with the displacement X, it is also possible to pass gradually from alternating voltage $V_1$ to alternating voltage $V_2$, by making $V_x$ and $V_{x1}$ alternately equal to $V_1$ and to $V_2$ with a variable duration of the pulses, this duration varying linearly with the displacement, as described by the above mentioned patent. It is also possible to vary $V_x$ and $V_{x1}$ linearly with time, i.e., to generate a continuous fictitious displacement, the phase of the passing points through zero correspond then to the displacement value X.

It is well understood that the ratio of the value of the spacing between axis T/L of the emitting and receiving coupling electrodes can be assigned other values. Also, the electronic assembly 50 could be made differently, as described in the Swiss Pat. No. 643.652.

The emitting and receiving electrodes could be mounted on the fixed part of the device while the coupling electrodes could be mounted on the ruler. The device could be also used for measuring angles, by placing coupling electrodes 6,7 in a circular manner inside a cylindrical surrounding and by placing the receiving electrodes 19,20 on a cylindrical bar operating in a revolving manner inside of that surrounding.

I claim:

1. A capacitative device for measuring lengths and angles, comprising a first part (2) and a second part (1), arranged in a sliding manner in the direction of displacement and measuring of the one part with respect to the other, the first part (2) carrying elongated emitting electrodes (10), disposed perpendicularly to the said direction to form a series and at least two receiving electrodes (19, 20) arranged laterally on each side of this series, the second part (1) being provided with coupling electrodes (6, 7), facing the emitting electrodes (10) and receiving electrodes (19, 20), and an electronic assembly (50), arranged to measure the relative displacement of the two parts through capacitative coupling by means of coupling electrodes (6, 7) between emitting electrodes (10) and receiving electrodes (19, 20), characterized in that the coupling electrodes (6, 7) are made by alternating L-shaped electrodes (6) and inverted L-shaped electrodes (7), interlocking themselves one into the other so that, except for the end electrodes, the vertical part (40) of each L-shaped electrode (6) is sandwiched between the vertical parts (40) of inverted L-shaped electrodes (7) and the vertical parts 40 of each inverted L-shaped electrode (7) is sandwiched between the vertical parts (40) of L-shaped electrodes (6), and so that the vertical parts (40) of the L-shaped and inverted L-shaped electrodes alternate and are closely adjacent each other and also are arranged to face the emitting electrodes (10), and wherein the horizontal parts (41) of the L-shaped electrodes are positioned closely adjacent each other and are arranged to face one of the receiving electrodes (19, 20) while the horizontal parts (41) of the inverted L-shaped electrodes are arranged to face the other of the receiving electrodes (19, 20).

2. Device according to claim 1, characterized in that the coupling electrodes (6,7) are arranged with an interaxial periodical distance (T) and that the emitting electrodes have a width such that 2N emitting electrodes (10) are facing a pair of coupling electrodes (6,7), N being an integer number.

3. Device according to claim 2, characterized in that the receiving electrodes (19,20) have a length equal to an integer number of distances (T).

4. Device according to claim 3, characterized in that it is provided with two receiving electrodes (19,20) have an offset of T/2 between each other in said direction.

5. Device according to claim 1, characterized in that the width of receiving electrodes (19,20) is smaller than the width of the series of emitting electrodes (10), measured in that direction.

6. Device according to claim 4, characterized in that the emitting electrodes (10) are connected to 2N outputs of the electronic assembly (50) in a manner that each N-th emitting electrode is connected to the same output of the electronic assembly (50).

7. Device according to claim 6, characterized in that the electronic assembly (50) is arranged in a manner that the emitting electrodes (10) are selectively connected to constant voltage ($V_1$ and $V_2$) and to variable voltages ($V_x$ and $V_{x1}$), the voltages ($V_x$ and $V_{x1}$) being generated in a manner that the captured signal on receiving electrodes (19,20), through capacitative coupling by electrodes (6,7) becomes equal to zero, the voltages ($V_x$ and $V_{x1}$) are then constituting a measure of relative displacement between the first and the second parts.

* * * * *

UNITED STATES PATENT AND TRADEMARK OFFICE
CERTIFICATE OF CORRECTION

PATENT NO. : 4,810,951

DATED : March 7, 1989

INVENTOR(S) : Hans U. Meyer

It is certified that error appears in the above-identified patent and that said Letters Patent is hereby corrected as shown below:

Col. 1, line 7, delete "of" and insert --with a-- line 8, delete "with a" and insert --of-- line 33, before "advantageous" insert --is-- line 45, correct the spelling of "interlock"

line 67, change "plain" to --plan--

Col. 2, line 6, delete "on" and insert --in-- line 28, change "Slider" to --slider--

Col. 3, line 31, correct the spelling of "distribution"

Col. 5, line 16, change "have" to --having--

Signed and Sealed this

Twenty-eighth Day of November 1989

Attest:

JEFFREY M. SAMUELS

*Attesting Officer*   *Acting Commissioner of Patents and Trademarks*